April 12, 1960
D. LABINO
2,932,587
COLORED GLASS FIBERS
Original Filed Aug. 31, 1953
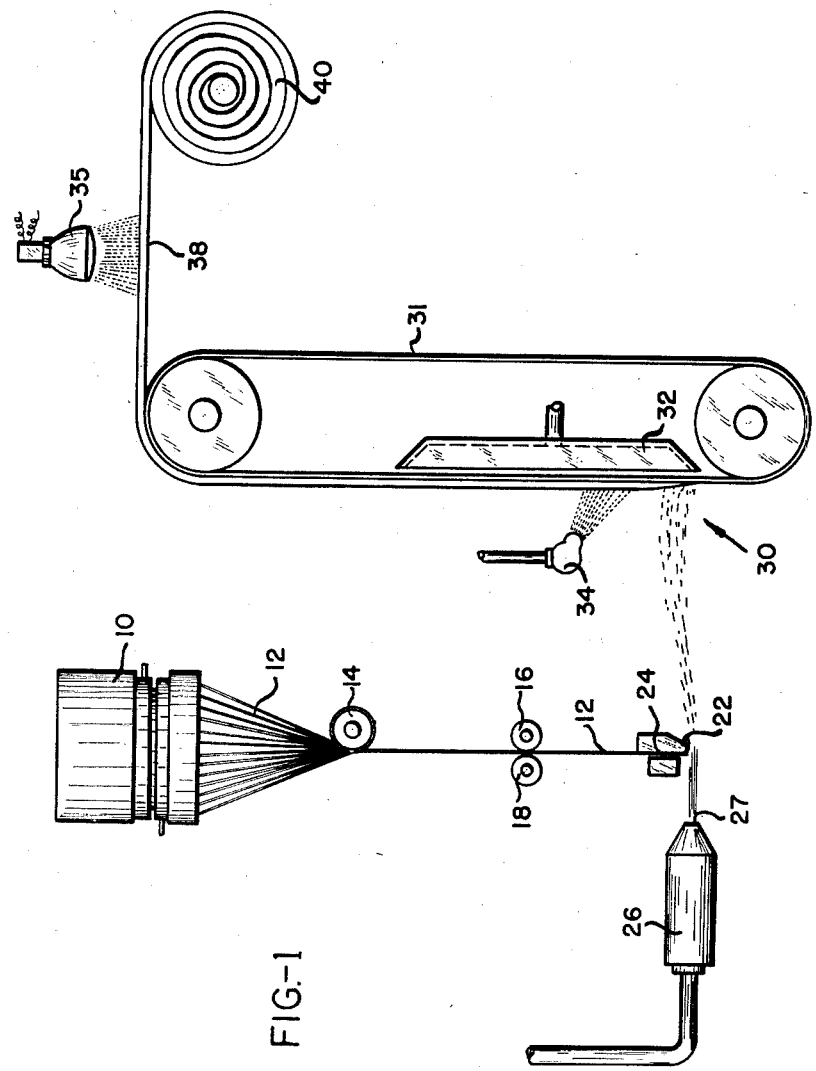
INVENTOR.
DOMINICK LABINO
BY Toulmin & Toulmin
ATTORNEYS

United States Patent Office 2,932,587
Patented Apr. 12, 1960

2,932,587

COLORED GLASS FIBERS

Dominick Labino, Maumee, Ohio, assignor to L. O. F. Glass Fibers Company, Toledo, Ohio, a corporation of Ohio Continuation of application Serial No. 377,528, August 31, 1953. This application September 14, 1956, Serial No. 610,028

4 Claims. (Cl. 117—104)

The present invention relates to colored glass fibers and more specifically to the production of bluish and bluish-green tinted glass fibers. This application is a continuation of my copending application, Serial No. 377,528, filed August 31, 1953, now abandoned.

Various attempts have been made to incorporate colors into glass fibers and such have included the introduction of the coloring material into the batch of glass which is to be attenuated. The high attenuation however, tends to weaken the coloration and such efforts have not resulted in clear, permanent color tones.

Past efforts have included the use in the batch of oxides of various metals as coloring agents—for example—the oxides of copper, manganese, iron and cobalt have been utilized. Cobalt oxide introduced into a batch of glass in high percentages produces the only satisfactory medium blue coloration and due to the amount of oxide necessary in the melt, the process is expensive and not so far as is known employed commercially.

Organic dyes have also been employed but the smoothness of the fibers, the cost of the dyes and the nature of the process steps and process materials preclude the economical use of these dyes in many applications.

It has now been found that water soluble Prussian blue, that is, a water soluble ferric ferrocyanide is ideally suited for providing a distinct coloration on glass fibers. This complex salt in the practice of the invention is employed in conjunction with a suitable resin to provide a distinct blue or to approach the green and blue-green; the resin color and that of the Prussian blue blend to provide on fibrous glass a novel insolubilized coloring material.

It is therefore a principal object of this invention to describe a novel glass fiber product having a distinct coloration produced by an inorganic salt.

It is a primary object of this invention to describe a novel bluish-colored glass fiber product.

It is an important object of this invention to describe a novel method for the coloring of glass fibers.

It is a particular object of this invention to describe an economical process for the coloring of glass fibrous products.

These and other allied objectives are attained preferably by forming an aqueous solution of the colored salt and applying the same to the fibers after they have been formed. In the preferred practice of the invention, a water soluble Prussian blue is combined with a phenolic resinous binding solution and is applied to the fibers with the bonding agent.

I have found that the water soluble phenolic formaldehydes are especially suited for this purpose as they are generally preferred as glass fiber binders, do not in the aqueous state effect the solubility of the Prussian blue when combined in accordance with this invention, and of themselves give to the glass fibers a yellowish tint which in combination with the Prussian blue in varying concentrations permits the attainment of range of colors from light green through a good blue.

An important feature of the invention is that water is the solvent for both the resin and the coloring material thus minimizing cost. Ordinarily, water solutions which contain ferric iron and materials having a phenolic group form a characteristic precipitate in water solution and the reaction is extremely sensitive. In fact, this reaction has been used as a qualitative test for the phenolic group. Accordingly, it is necessary to provide means for stabilizing the solution and prevent this reaction from taking place when Prussian blue is combined with uncured or partially cured phenol formaldehyde resin in a water solution. For stability purposes in solution, a very small amount of ammonia and oxalic acid are usually employed, the oxalic acid being effective to inhibit precipitation of the Prussian blue and phenolic resin.

The invention will be more fully understood by reference to the following detailed description and accompanying drawing wherein the single figure illustrates a preferred embodiment of the inventive concept.

Referring to the drawing there is shown at 10 a pot of molten glass from which fibers 12 are drawn; the small fibers solidify rapidly and are caused to be moved over guide roller 14 by the action of drawing rolls 16, 18 which are themselves driven by suitable conventional means (not shown).

The primary fibers 12 are advanced by the drawing rolls over the flat face 24 of a guide block having a V-shaped edge 22; in horizontal alignment with the edge 22 is a high velocity gas burner 26, the discharge slot 27 of which permits a gas blast to issue directly at the ends of fibers 12.

The fibers attenuated and blown by the gas blast are collected at 30 on a moving belt 31 with the assistance of a vacuum system, a portion of which is indicated at 32. The illustrated collection equipment and the power means therefor are conventional and accordingly are not set forth in detail in the schematic illustration.

As the fibers are collected and moved upwardly, a spray head 34 applies a resinous solution containing water soluble phenol formaldehyde and Prussian blue to the fibers; the water may be readily dried from the fibers in the course of the upward travel thereof and to induce this, heat may suitably be applied as by an infrared lamp at 35 which in the case of the thermosetting resin also assists the insolubilizing and hardening thereof.

The web 38 of glass fibers, coated with the insolubilized resin and Prussian blue, may be passed from the upper pulley of the conveying system to a reel 40 or otherwise suitably packaged.

The solution applied at spray head 34 to result in a good blue coloration on the fibers preferably contains:

| | Gallons |
|---|---|
| Phenol formaldehyde (water soluble) | 1.25 |
| Prussian blue mix | 1 |
| Water | 50 |

The Prussian blue mix contains:

| | | |
|---|---|---|
| Prussian blue (water soluble) | grams | 270 |
| Oxalic acid | do | 35 |
| Ammonia (NH$_4$OH) | quart | 1 |

Water, sufficient to make 1 gallon.

The oxylate present inhibits the precipitation reaction which normally takes place when phenolic solutions are mixed with Prussian blue.

Preferably the phenol formaldehyde and Prussian blue mix are not mixed until shortly before the solution is applied to the glass fibers because even though the oxylate radical inhibits the unwanted precipitation, deterioration of the solution begins after a period of time.

After the resin has been applied to the fiber and heat cured, there is no longer any likelihood of deterioration and glass fiber mats prepared in accordance with this invention are stable for years.

It is to be noted that the phenol formaldehyde would of itself give a yellow coloration to the fibers and the concentration of the Prussian blue may be varied to present a greenish hue rather than the clear blue obtainable with the above formulation. Thus, with the quantities of all other components remaining the same, the content of Prussian blue in the formulation may be halved from 270 grams to 135 grams to provide a light green. Distinct shades of blue-green are thus obtainable by varying only the one component between the indicated limits.

The Prussian blue may be applied separately to the material if desired and in this case, the resin is applied first and the blue is applied thereafter.

An important feature of the invention is that cost is materially reduced as compared with processes which employ organic coloring materials; the cost of the coloring material is itself low and the ability to use water as the solvent medium renders the procedure quite cheap. In addition, the phenolic resins are also a preferred glass binder, both on a cost basis and on the basis of satisfactory results.

The product of the process has utility in fabrics and related fibrous glass structures, is stable, may be readily produced in different shadings by varying the concentration of Prussian blue, and the coloring matter is adherent. In the product the resin performs its usual function of binding the fibers together, and further, assists the retention of the coloring matter as well as contributing to the coloration of the product.

The blue coloration is not apparently affected by the alkali of the glass and retains its coloration when stored under conditions of relatively high humidity.

It is to be understood that the foregoing specific embodiment is illustrative only as the coloring matter may be applied directly to unblown filaments; it is further to be noted that while filament size is not critical, the procedure is particularly applicable to filaments having small diameters—that is on the order of 5 microns and less; also the chemical constituency of the glass is not a critical factor.

It will be understood that this invention is susceptible to modification in order to adopt it to different usages and conditions and accordingly, it is desired to comprehend such modifications within this invention as may fall within the scope of the appended claims.

I claim:

1. The method of coloring glass fibers which comprises, providing a mass of glass fibers, providing an aqueous coloring material containing:

| | |
|---|---|
| Phenol-formaldehyde resin (water soluble) gallons__ | 1.25 |
| Prussian blue (water soluble) _____grams__ | 270 |
| Oxalic acid _____do____ | 35 |
| Ammonia ($NH_4OH$) _____quart__ | 1 |

Water-sufficient to make 50 gallons.

spraying the mass with said coloring material, and heating the sprayed fibers to remove the water of solution and cure the resin contained in said coloring material and bond the fibers together in their points of intersection.

2. In the method of providing colored glass fibers the step comprising contacting the fibers with a colored binder solution, said binder solution comprising a water solution of a phenol-formaldehyde resin, water-soluble Prussian blue and oxalic acid for inhibiting the precipitation reaction of the Prussian blue.

3. The method of coloring glass fibers which comprises providing a mass of glass fibers, providing a water solution of phenol-formaldehyde resin and Prussian blue, said solution containing oxalic acid for inhibiting precipitation of the Prussian blue, spraying the fibers with the solution, and heating the sprayed fibers to remove the water of solution and cure the resin and bond the fibers together at their points of intersection.

4. Colored glass fibers made by the method of claim 3.

References Cited in the file of this patent
UNITED STATES PATENTS

| | | |
|---|---|---|
| 302,544 | Conant _____ | July 29, 1884 |
| 2,117,371 | Slayter _____ | May 17, 1938 |
| 2,315,329 | Hood et al. _____ | Mar. 30, 1943 |
| 2,319,142 | Lebach _____ | May 11, 1943 |
| 2,582,919 | Biefeld _____ | Jan. 15, 1952 |
| 2,688,580 | Fingerhut _____ | Sept. 7, 1954 |